(12) United States Patent
Salter et al.

(10) Patent No.: US 10,730,400 B2
(45) Date of Patent: Aug. 4, 2020

(54) FRONT GRILLE STORAGE

(71) Applicant: FORD GLOBAL TECHNOLOGIES, LLC, Dearborn, MI (US)

(72) Inventors: Stuart C. Salter, White Lake, MI (US); Dave Brian Glickman, Southfield, MI (US); Paul Kenneth Dellock, Northville, MI (US); Cornel Lewis Gardner, Romulus, MI (US); Mark Wisneski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/049,949

(22) Filed: Jul. 31, 2018

(65) Prior Publication Data

US 2020/0039359 A1    Feb. 6, 2020

(51) Int. Cl.
*B60L 53/16*    (2019.01)

(52) U.S. Cl.
CPC ................... *B60L 53/16* (2019.02)

(58) Field of Classification Search
CPC ..... B60L 53/16; B60L 2270/34; H01R 13/72; H02G 11/02
See application file for complete search history.

(56) References Cited

U.S. PATENT DOCUMENTS

| 5,678,872 | A | * | 10/1997 | Slater | B60R 3/02 292/35 |
|---|---|---|---|---|---|
| 5,720,627 | A | | 2/1998 | Gillbrand et al. | |
| 5,919,048 | A | | 7/1999 | Slattery | |
| 6,474,715 | B2 | * | 11/2002 | Fukushima | B60R 5/04 296/37.1 |
| 6,644,707 | B2 | * | 11/2003 | McLaughlin | B60R 5/041 224/311 |
| 8,356,852 | B2 | * | 1/2013 | Lucas | B60R 7/02 293/118 |
| 8,602,469 | B2 | * | 12/2013 | Stiles | B66C 1/442 294/104 |
| 9,174,584 | B1 | * | 11/2015 | Cha | B60R 9/10 |
| 9,409,525 | B2 | | 8/2016 | Gillam et al. | |
| 10,272,861 | B2 | * | 4/2019 | Wymore | B60R 19/48 |
| 10,562,456 | B2 | * | 2/2020 | Lynch | B60R 9/06 |
| 2017/0253137 | A1 | | 9/2017 | Stauber et al. | |

FOREIGN PATENT DOCUMENTS

| WO | 2012041277 | 4/2012 |
|---|---|---|
| WO | 2012095225 | 7/2012 |

* cited by examiner

*Primary Examiner* — Richard V Muralidar
(74) *Attorney, Agent, or Firm* — David Coppiellie; Carlson, Gaskey & Olds, P.C.

(57) ABSTRACT

A storage and charging system for a motor vehicle includes a drawer assembly front portion comprising a portion of the front grille. The drawer assembly is movable between open and closed positions by an actuator and provides a storage space that may be used for a charging cable. An electrical connection is disposed within the drawer assembly and provides an electrical coupling between a charging cable and a battery of the motor vehicle.

18 Claims, 4 Drawing Sheets

FRONT GRILLE STORAGE

TECHNICAL FIELD

This disclosure relates to a storage compartment disposed within a grille of a motor vehicle that includes an electrical connection.

BACKGROUND

Motor vehicles are increasingly including electrical devices and propulsion systems. An electric vehicle requires that the battery be charged periodically to maintain sufficient power. Accordingly, an electric vehicle is plugged into a charger when parked. Chargers are typically provided with a cable and therefore the vehicle operator need not have one. However, in instances when a charger is not available, the operator will need to use their own cable. Storage and removal of a charging cable can be cumbersome and difficult. Moreover, theft of an expensive charging cable is possible unless secured in some manner.

Automotive manufactures continually seek new features to ease operation and increase operator satisfaction and enjoyment.

SUMMARY

A storage system for a motor vehicle according to an exemplary aspect of the present disclosure includes, among other things, a front grille and a drawer assembly including a front portion comprising a portion of the front grille, the drawer assembly moveable outwardly from the front grille to provide access to a storage space.

A further non-limiting embodiment of the foregoing storage system, includes an actuator for moving the drawer assembly between an open position where the drawer assembly is moved outwardly from the front grille and a closed position wherein the front portion is substantially flush with the front grille.

In a further non-limiting embodiment of any of the foregoing storage systems, a controller controls operation of the actuator for moving the drawer assembly responsive to a received prompt.

In a further non-limiting embodiment of any of the foregoing storage systems, a key pad is disposed within the front portion and is in communication with the controller for providing the prompt to move the drawer assembly.

In a further non-limiting embodiment of any of the foregoing storage systems, a communication device is coupled to the controller through a wireless link for providing the prompt to move the drawer assembly.

In a further non-limiting embodiment of any of the foregoing storage systems, the controller is configured to automatically open the drawer assembly in response to detection of an authenticated communication device near the front grille.

In a further non-limiting embodiment of any of the foregoing storage systems, the controller is configured to automatically close the drawer assembly in response to detection of a charging connection to a battery of the motor vehicle.

In a further non-limiting embodiment of any of the foregoing storage systems, an electrical connection is located within the storage space.

In a further non-limiting embodiment of any of the foregoing storage systems, the front portion includes a closeable opening sized to enable an electrical conduit connected to the electrical connection to extend through the front portion when the drawer assembly is in a closed position.

In a further non-limiting embodiment of any of the foregoing storage systems, a charging cable for charging a battery is located within the vehicle, the electrical connection coupled to the battery and the charging cable is coupled to the electrical connection.

In a further non-limiting embodiment of any of the foregoing storage systems, the electrical connection is coupled to a block heater with the motor vehicle.

A charging system for a motor vehicle according to an exemplary aspect of the present disclosure includes, among other things, a drawer assembly including a front portion comprising a portion of a front grille, an electrical connection disposed within the drawer assembly and coupled to a battery of the motor vehicle, and a charging cable coupled to the electrical connection and disposed within the drawer assembly.

In a further non-limiting embodiment of any of the foregoing charging systems, the front portion includes a closeable opening sized to enable the charging cable to extend through the front portion when the drawer assembly is in a closed position.

In a further non-limiting embodiment of any of the foregoing charging systems, a key pad is disposed within the front portion and in communication with the actuator for providing a prompt to move the drawer assembly.

In a further non-limiting embodiment of any of the foregoing charging systems, a controller is configured to automatically open the drawer assembly in response to detection of an authenticated communication device near the front grille and close the drawer assembly in response to detection of a charging connection to the charging cable.

A method of operating a charging system for a motor vehicle according to another exemplary aspect of the present disclosure includes, among other things, automatically opening a drawer assembly disposed within a front grille of a motor vehicle responsive to detection of an authentication device proximate the front grille, wherein the drawer assembly includes a charging cable electrically coupled for charging a battery within the motor vehicle and automatically closing the drawer assembly responsive to detection of a charging connection to the charging cable.

In a further non-limiting embodiment of the foregoing method, the charging cable extends through a closable opening in a front portion of the drawer assembly such that the charging cable extends from the drawer assembly when the drawer assembly is in a closed position.

In a further non-limiting embodiment of any of the foregoing methods, a hand gesture is recognized with a sensor disposed on the front portion of the drawer assembly and either opening or closing the drawer assembly responsive to recognition of the hand gesture.

The various features and advantages of this disclosure will become apparent to those skilled in the art from the following detailed description. The drawings that accompany the detailed description can be briefly described as follows.

DETAILED DESCRIPTION

Figure 1:
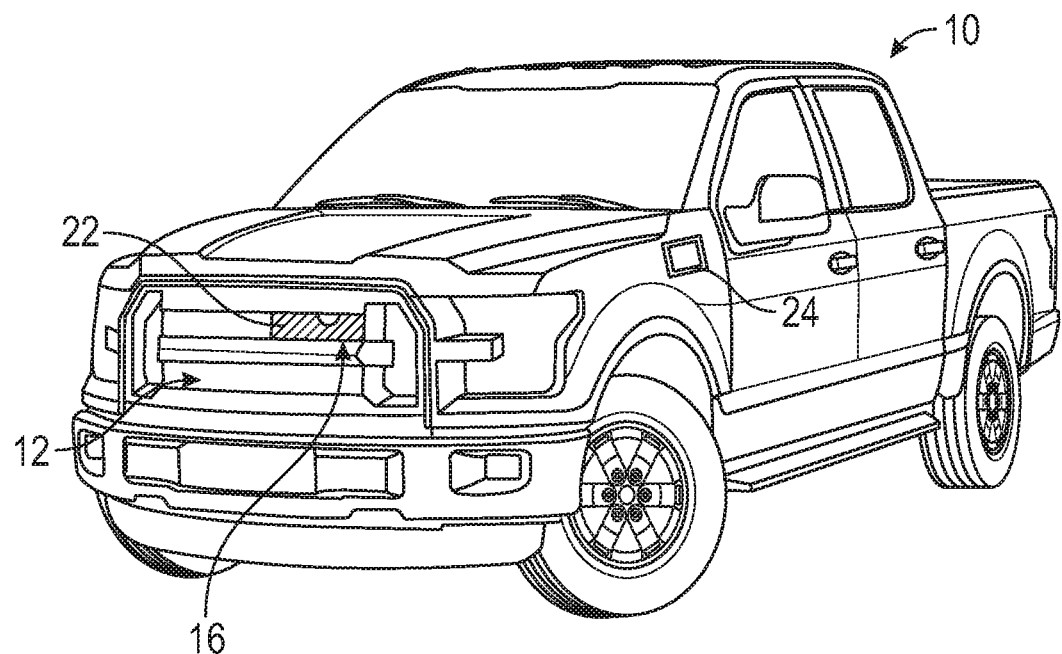
FIG. 1 is a schematic view of a vehicle including an example drawer storage assembly embodiment.
Figure 2:
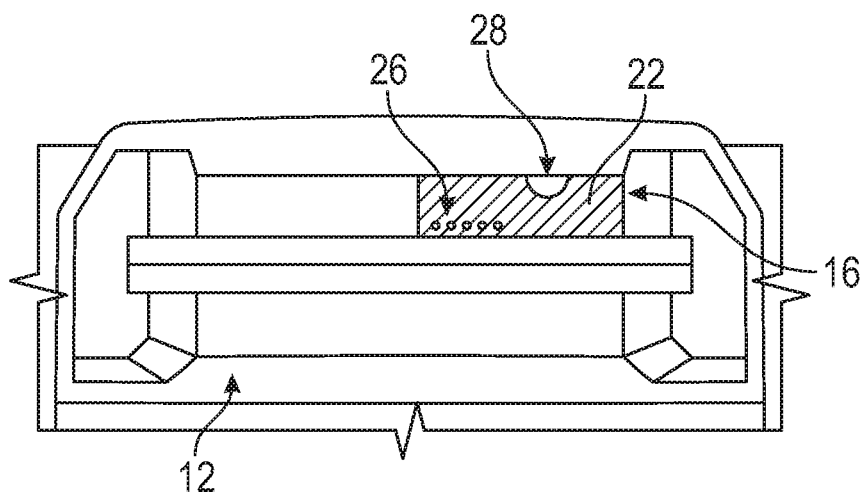
FIG. 2 is a front view of the example drawer storage assembly.

Referring to FIGS. 1 and 2, a motor vehicle 10 includes a front grille 12 and a drawer assembly 16. The drawer assembly 16 is positioned within the front grille 12 such that a front portion 22 is a corresponding part of the grille 12. In this disclosed example, the vehicle 10 is an electric-powered vehicle including a charging port 24. The example drawer assembly 16 includes features for storing and securing a charging cable when both in use and not in use.

The example front grille 12 includes a plurality of bars with a front portion 22 of the drawer assembly 16 making up a visually corresponding surface with the grille 12. Although the example grille 12 includes bars, other grille configurations and arrangements will benefit from and are within the contemplation of this disclosure. The front portion 22 of the drawer assembly 16 includes a touch key pad 26 and a closeable opening 28. The touch key pad 26 prompts an actuator to move the drawer assembly between an open and closed position in response to entering of a proper code. The closeable opening 28 enables a charging cable to extend from the drawer assembly 16 when it is in a closed position. The closable opening 28 may include a spring loaded door that moves with insertion of a cable. The opening 28 may also include a flexible material such as rubber that conforms around the cable when inserted through the opening 28.

Figure 3:
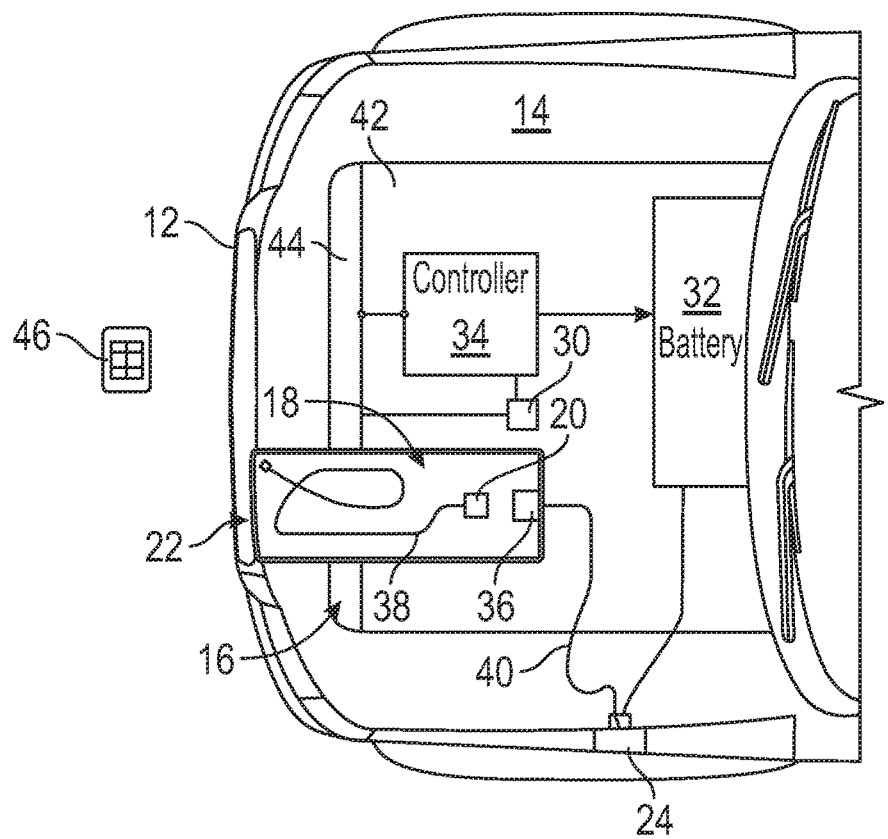
FIG. 3 is a top view of the example drawer assembly in a closed position.
Figure 4:
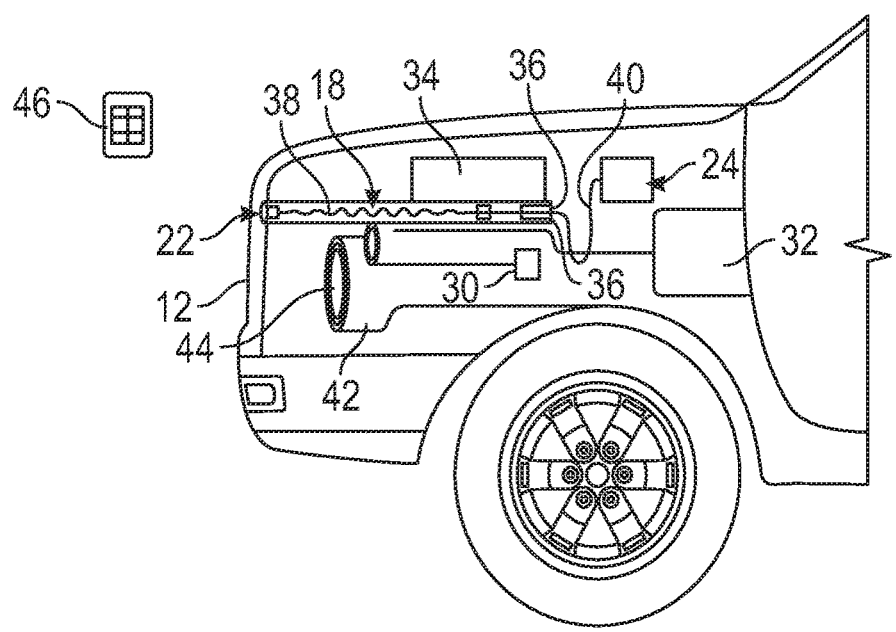
FIG. 4 is a side view of the example drawer assembly in the closed position.

Referring to FIGS. 3 and 4, the example drawer assembly 16 is shown schematically within a motor vehicle 10. The drawer assembly 16 is provided within a front compartment 14 of the vehicle 10 within available space. The available space may be between an engine block 42 and the hood for vehicles including a front mounted engine. Alternatively, the drawer assembly 16 may retract into an open space provided in vehicle that do not include a front mounted motor such as for example an electrically powered vehicle.

Figure 5:
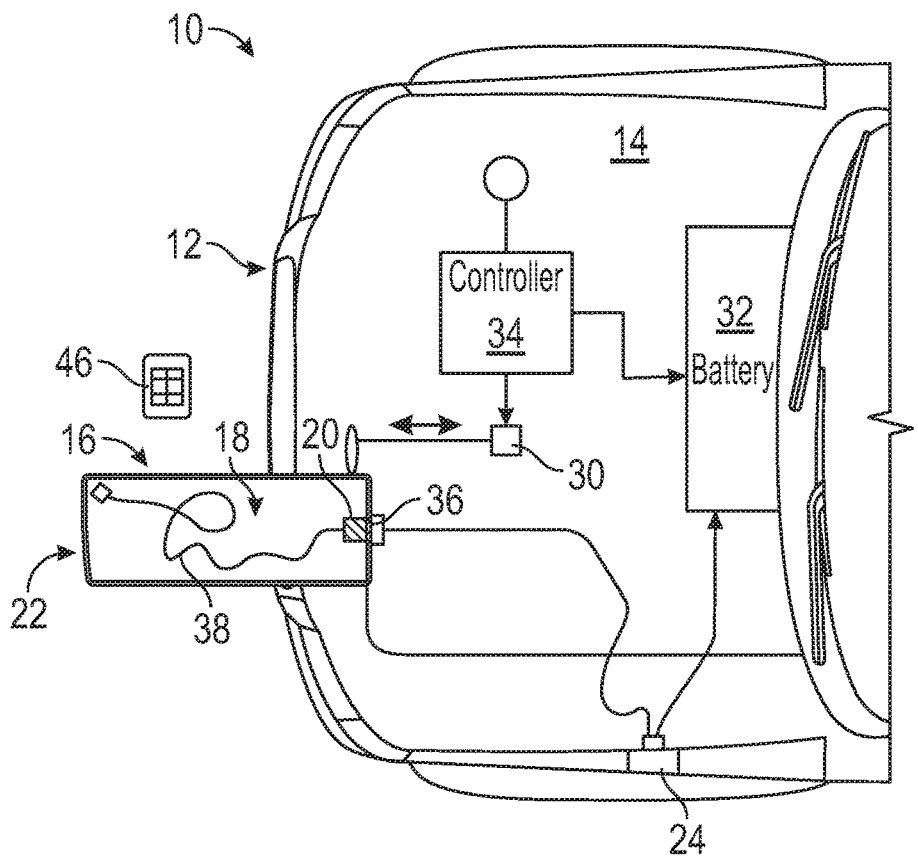
FIG. 5 is a top view of the example drawer assembly in an open position.
Figure 6:
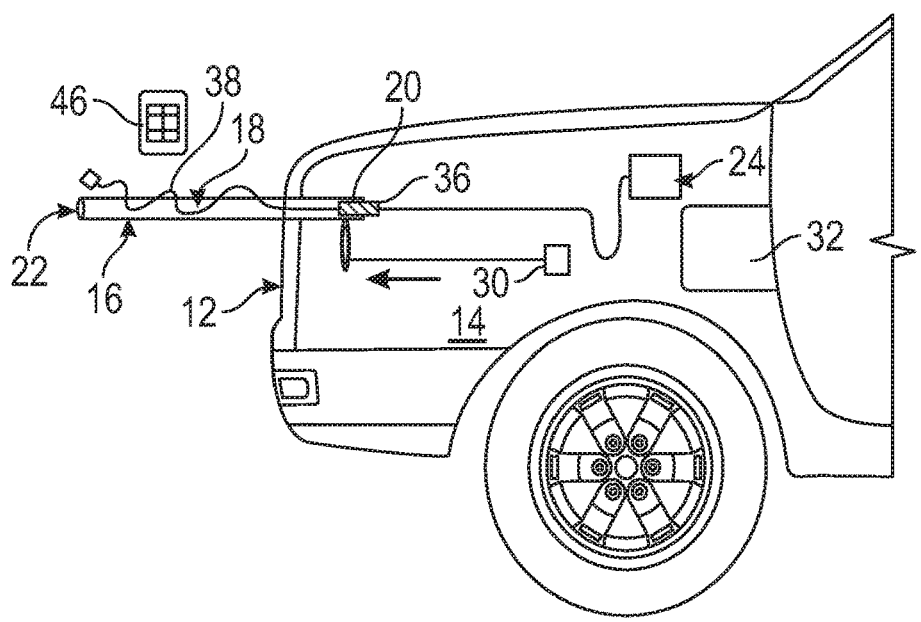
FIG. 6 is a side view of the example drawer assembly in the open position.

The drawer assembly 16 is moveable from a closed position illustrated in FIGS. 3 and 4 and in an open position illustrated in FIGS. 5 and 6. The drawer assembly 16 includes the front portion 22 that includes the keypad 26 and the opening 28. Moreover, the front portion 22 in this example is an integrated part of the front vehicle grille 12, such that it blends and substantially hides the presence of the drawer assembly 16. The front portion 22 may also be provided within a space between grille elements and recessed from the front surface of the grille 12 to hide it from casual observation.

The keypad 26 may be a capacitive keypad mounted on a plastic access panel on the front portion 22. The keypad 26 maybe dead fronted to match the color of the grille 12 or covered with a dark plastic for concealment. The dead fronted keypad 26 would be activated in response to detection of hand movements near the keypad 26, or with a first touch. A code entered into the keypad 26 enables operation and opening of the drawer assembly 16.

The drawer assembly 16 is powered by an actuator 30 to drive the drawer between an open position and a closed position. The actuator 30 is controlled by a controller 34. The actuator 30 is shown schematically and may be an electric motor driving a shaft or other mechanism configured to move the drawer between open and closed positions. The controller 34 may be a dedicated controller for the example drawer assembly 16 or may be part of the larger vehicle controller that controls various features of the vehicle.

The drawer assembly 16 includes an electrical connection 36, such that an electrical coupling 20 of a charging cable 38 may be coupled to the electrical connection 36 to provide a charging connection with a battery 32 disposed within the vehicle. In this disclosed example, the charging cable 38 provides for a connection between the battery 32 of the vehicle and a charging port. The battery 32 provides power to the vehicle and to an electrical propulsion system.

It should also be understood that the drawer assembly 16 may also include a cable for providing an electrical connection to a block heater 44 for maintaining an engine 42 at a desired temperature as is typically used for vehicles operating in colder climates.

The example electrical connection 36 is coupled to the port 24 and the battery 32 by way of a wiring harness 40. As appreciated, the wiring harness 40 will provide sufficient slack to accommodate movement of the drawer assembly 16 between the open and closed positions.

The drawer assembly 16 provides an interior storage space that is securable to control access. Access is enabled through input of a code using the key pad 26. Moreover, the drawer assembly 16 may be actuated in response to receiving a prompt signal from a wireless communication device 46 that is authenticated by the vehicle 10. The device 46 could be a key fob or a cell phone or any other communication device that is linked to the vehicle and that may communicate and enable control of certain functions of the vehicle 10.

The controller 34 includes features that can detect the presence of the wireless communication device 46 and actuate the drawer assembly 16 responsive to a determined position. In one disclosed example, the controller 34 will command the actuator 30 to open the drawer assembly 16 in response to detecting the wireless communication device to be at a forward position relative to the vehicle 10 proximate the front vehicle grille 12.

The controller 34 may also be programmed to open the drawer assembly 16 responsive to other prompts, such as a proximate location to a charging station or based on prompts and instructions provided through the wireless communication device 46. Additionally, the controller 34 may be prompted to open the drawer assembly 16 in response to actuation of an internal control within the vehicle cabin. The controller 34 is further configured to close the drawer assembly 16 in response to a triggering event. A triggering event may include a detection that the power is flowing through the charging cable 38 and therefore the drawer assembly 16 may be closed. In such an operation, the charging cable 38 will have been threaded through the opening 28 so that the charging cable 38 does not interfere with movement to the closed position. In the event that the charging cable 38 is not properly threaded through the opening 28, the controller 34 will recognize this obstruction with either a sensor or in response to an increased in current to the actuator indicative of pinching of the cable 38 or some other interference that prevents closing of the drawer assembly 16. A passage of defined time may also trigger closing of the drawer assembly 16 to safeguard against the drawer being unintentionally left open and unattended. Further, a recognition that an authorized device, such as a user's cell phone or vehicle key fob is no longer proximate the vehicle could also be utilized by the controller 34 to trigger automatic closing of the drawer assembly 16.

Referring to FIGS. 5 and 6, with continued reference to FIGS. 3 and 4, in the disclosed example, the drawer assembly 16 holds the charging cable 38 for connection of the motor vehicle 10 and, specifically, the battery 32 to a charging center to maintain the desired charge level. As appreciated in many applications, a charger may be utilized and plugged in to the externally accessible charging port 24. In such instances, the charging cable 38 carried with the vehicle is not necessary. However, in other circumstances, a charging center is not available and a vehicle's own charging cable 38 must be utilized and plugged into an electrical outlet. In such instances, the drawer assembly 16 can be extended outwardly by the actuator 30 in response to either a position of an occupant including the wireless communication device 46 or through input of a code into the key pad 26 disposed on the front portion 22 of the drawer assembly 16.

An operator can then remove as much of the charging cable 38 as necessary to reach a charging center. Once the charging cable 38 is plugged into the charging center, the operator will arrange the charging cable 38 such that it extends through the closeable opening 28. When the charging cable 38 is extended through the closeable opening 38 in front portion 22, the drawer assembly 16 can be moved to the closed position. In the closed position, the contents of the drawer assembly 16 including the stored portion and end of the charging cable are not accessible and therefore less susceptible to theft.

Figure 7:
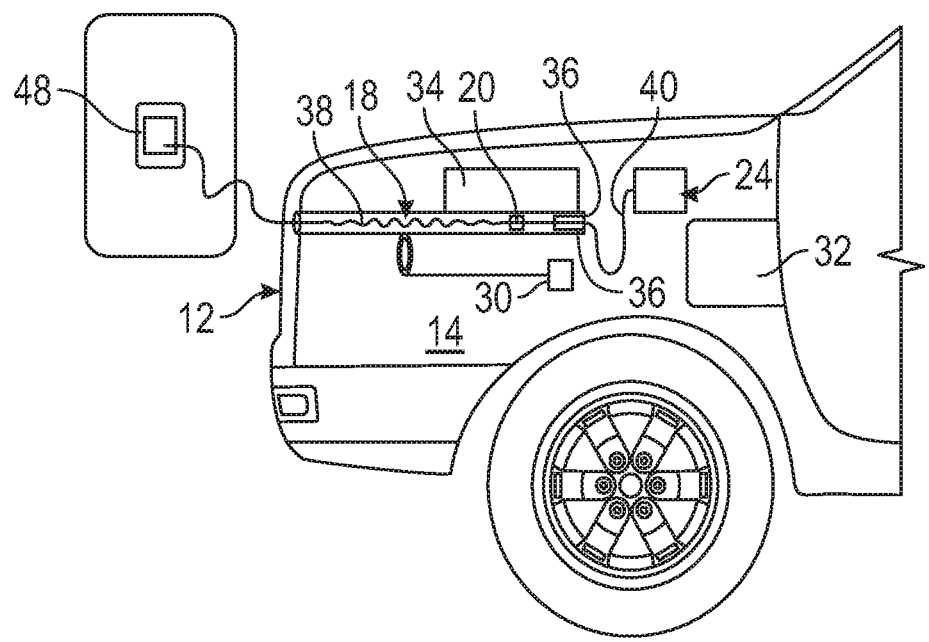
FIG. 7 is a side view of the example drawer assembly in a closed position with a charging cable connected to an electric outlet.
Figure 8:
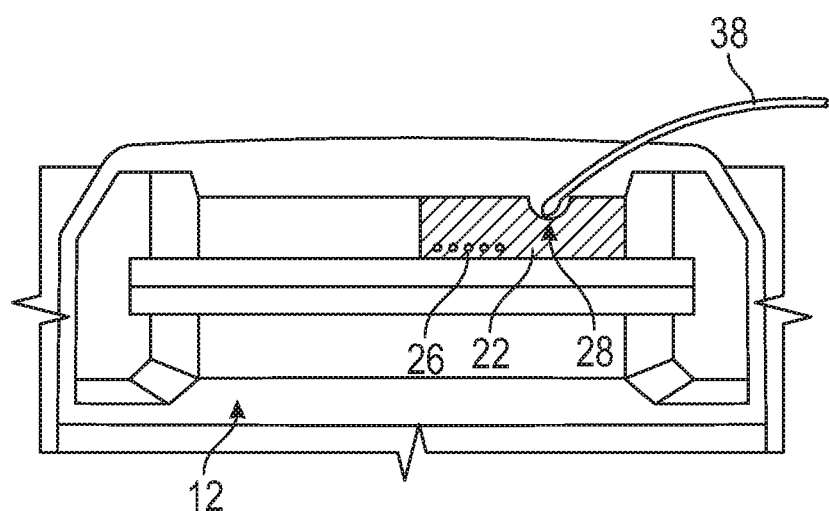
FIG. 8 is a front view of a cable extending through a front portion of the example drawer assembly.

Referring to FIGS. 7 and 8, the example charging cable 38 is shown extended from a drawer assembly 16 when the drawer assembly 16 is in a closed position. In this position, the charging cable extends from the vehicle and is connected to an electrical outlet 48 or other compatible electrical connection. Because the cable 38 is secured within the drawer assembly 16, the charging cable 38 is substantially secure from theft. As appreciated, the drawer assembly 16 is openable only in response a prompt received from the authorized communication device 46, such as a cell phone or key fob. Additionally, access to the drawer assembly 16 may be provided through the use of an access code input into the key pad 26 disposed on the front portion 22 of the drawer assembly 16. Several access codes can be provided along with a one-time use access code to allow one-time access to retrieve items stored within the drawer assembly 16.

Although the example drawer assembly is disclosed and described by way of example for storage of a charging cable, other items that need to be carried with the vehicle that that need to be secured could be stored within the drawer assembly 16.

Accordingly, the example drawer assembly 16 provides access to certain useful accessories, such as a charging cable from an exterior portion of the vehicle eliminating the need to store such items within an interior compartment of the vehicle. Moreover, storage of the charging cable within the example drawer assembly 16 enables an electrical connection to be maintained to simplify charging operations.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A storage system for a motor vehicle comprising:
a front grille;
a drawer assembly including front portion comprising a portion of the front grille, the drawer assembly moveable outwardly from the front grille to provide access to a storage space.

2. The storage system as recited in claim 1, further comprising an actuator for moving the drawer assembly between an open position where the drawer assembly is moved outwardly from the front grille and a closed position wherein the front portion is substantially flush with the front grille.

3. The storage system as recited in claim 2, a controller that controls operation of the actuator for moving the drawer assembly responsive to a received prompt.

4. The storage system as recited in claim 3, including a key pad disposed within the front portion and in communication with the controller for providing the prompt to move the drawer assembly.

5. The storage system as recited in claim 3, including a communication device coupled to the controller through a wireless link for providing the prompt to move the drawer assembly.

6. The storage system as recited in claim 3, wherein the controller is configured to automatically open the drawer assembly in response to detection of an authenticated communication device near the front grille.

7. The storage system as recited in claim 6, wherein the controller is configured to automatically close the drawer assembly in response to detection of a charging connection to a battery of the motor vehicle.

8. The storage system as recited in claim 1, further comprising an electrical connection located within the storage space.

9. The storage system as recited in claim 8, wherein the front portion includes a closeable opening sized to enable an electrical conduit connected to the electrical connection to extend through the front portion when the drawer assembly is in a closed position.

10. The storage system as recited in claim 8, further comprising a charging cable for charging a battery located within the vehicle, the electrical connection coupled to the battery and the charging cable coupled to the electrical connection.

11. The storage system as recited in claim 8, wherein the electrical connection is coupled to a block heater with the motor vehicle.

12. A charging system for a motor vehicle comprising:
a drawer assembly including front portion comprising a portion of a front grille;

an actuator controllable for opening and closing the drawer assembly;

an electrical connection disposed within the drawer assembly and coupled to a battery of the motor vehicle; and a charging cable coupled to the electrical connection and disposed within the drawer assembly.

13. The charging system as recited in claim 12, wherein the front portion includes a closeable opening sized to enable the charging cable to extend through the front portion when the drawer assembly is in a closed position.

14. The charging system as recited in claim 12, including a key pad disposed within the front portion and in communication with the actuator for providing a prompt to move the drawer assembly.

15. The charging system as recited in claim 12, further including a controller that is configured to automatically open the drawer assembly in response to detection of an authenticated communication device near the front grille and close the drawer assembly in response to detection of a charging connection to the charging cable.

16. A method of operating a charging system for a motor vehicle comprising:

automatically opening a drawer assembly disposed within a front grille of a motor vehicle responsive to detection of an authentication device proximate the front grille, wherein the drawer assembly includes a charging cable electrically coupled for charging a battery within the motor vehicle; and automatically closing the drawer assembly responsive to detection of a charging connection to the charging cable.

17. The method as recited in claim 16, including extending the charging cable through a closable opening in a front portion of the drawer assembly such that the charging cable extends from the drawer assembly when the drawer assembly is in a closed position.

18. The method as recited in claim 16, further comprising recognition of a hand gesture with a sensor disposed on the front portion of the drawer assembly and either opening or closing the drawer assembly responsive to recognition of the hand gesture.

* * * * *

UNITED STATES PATENT AND TRADEMARK OFFICE
CERTIFICATE OF CORRECTION

PATENT NO. : 10,730,400 B2
APPLICATION NO. : 16/049949
DATED : August 4, 2020
INVENTOR(S) : Stuart C. Salter et al.

Page 1 of 1

It is certified that error appears in the above-identified patent and that said Letters Patent is hereby corrected as shown below:

In the Claims

Claim 1, Column 6, Line 20; before "front portion" insert --a--

Claim 12, Column 6, Line 66; before "front portion" insert --a--

Signed and Sealed this
Fifteenth Day of September, 2020

Andrei Iancu
*Director of the United States Patent and Trademark Office*